BRACELET WITH CLASP TO ADJUST THE LENGTH THEREOF

Original Filed April 8, 1965

INVENTOR.
OLOF VERNER ANDERSON
BY
William Frederick Werner
ATTORNEY

Oct. 6, 1970 O. V. ANDERSON 3,531,948

BRACELET WITH CLASP TO ADJUST THE LENGTH THEREOF

Original Filed April 8, 1965 4 Sheets-Sheet 2

INVENTOR.
OLOF VERNER ANDERSON
BY
William Frederick Werner
ATTORNEY

BRACELET WITH CLASP TO ADJUST THE LENGTH THEREOF

Original Filed April 8, 1965

INVENTOR.
OLOF VERNER ANDERSON
BY
William Fredrich Werner
ATTORNEY

Oct. 6, 1970 O. V. ANDERSON 3,531,948

BRACELET WITH CLASP TO ADJUST THE LENGTH THEREOF

Original Filed April 8, 1965 4 Sheets-Sheet 4

INVENTOR.
OLOF VERNER ANDERSON
BY
William Frederick Werner
ATTORNEY

United States Patent Office 3,531,948

Patented Oct. 6, 1970

3,531,948

BRACELET WITH CLASP TO ADJUST THE LENGTH THEREOF

Olof Verner Anderson, North Kingston, R.I., assignor to Anson, Inc., Providence, R.I., a corporation of Rhode Island Original application Apr. 8, 1965, Ser. No. 446,497, now Patent No. 3,417,578, dated Dec. 24, 1968. Divided and this application June 4, 1968, Ser. No. 734,481

Int. Cl. A44c 5/04

U.S. Cl. 63—5 2 Claims

ABSTRACT OF THE DISCLOSURE

An adjustable bracelet comprising a band, a clasp casing having an end wall formed with an opening through which the band freely passes, a clasp secured to one end of said band, cooperating elements of a detachable connection on said clasp and casing, an abutment plate in said casing having an end normally in abutting engagement with said end wall, and an anchor member fixedly secured to the other end of the band and normally located within the casing, said abutment plate being structurally designed to have said anchor member secured thereto at one of several locations spaced from the end abutting the end wall.

This invention relates to ornamental bracelets and more particularly to an adjustable band construction for use with identification bracelets, watch bracelets and the like, whereby the effective length of the bracelet may be varied.

This application is a division of U.S. patent application Ser. No. 446,497, filed Apr. 8, 1965, now U.S. Pat. No. 3,417,578.

One difficulty involved in selling jewelry of the type to be worn around a wrist or ankle is that the size requirements vary. Until now, the majority of bracelets sold required structural alteration by the removal or insertion of elements on the bracelet, to get a proper fit.

Of the bracelets which had provisions for adjustment of the bracelet length some were unsightly and others did not have the structural strength to withstand extensive use.

The present invention overcomes these problems by providing a bracelet which is adjustable by means of quick and simple manipulations and which is aesthetically appealing because the adjustable mechanism is normally wholly contained within the bracelet catch casing.

An object of the present invention is to provide a bracelet of the type described whose length may be easily and quickly adjusted without structurally modifying the bracelet.

Another object of the present invention is to provide a bracelet of the type described in which the structural provisions for the length adjustments are normally contained within the bracelet catch casing so that the bracelet will retain its pleasing appearance.

A further object of the present invention is to provide a bracelet of the type described wherein a portion of the length adjustment structure abuts against an end wall of the bracelet catch casing thereby enhancing its structural strnegth.

Other objects and advantages of the invention will become apparent from the following description and the accompanying drawings which describe and show for illustrative purposes certain embodiments of the present invention.

In the drawings the bracelets shown utilize a metallic chain known in the trade as a snake chain. It should be understood that the novel adjustment feature of the present invention may also be used with woven textile or link chain bracelets, all of which may be referred to as bands.

Figure 1:
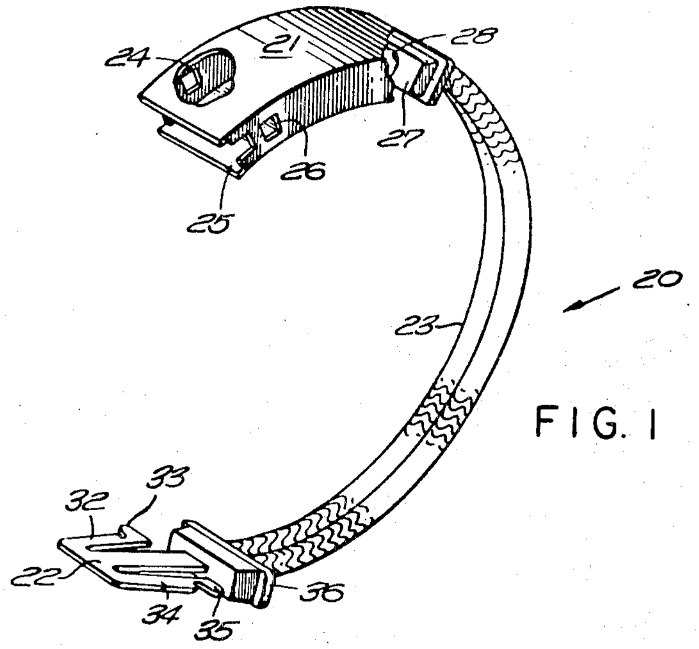
FIG. 1 is a perspective view of an identification bracelet showing one form of clasp and casing, constituting the invention, with portions broken away, for clarity.

Referring in greater detail to the drawings, particularly FIGS. 1–5, the numeral 20 generally denotes an identification bracelet having a clasp casing 21 and a clasp 22 fastened to one end of a band or chain 23, shown here as a pair of chains, referred to generally as snake chains. These basic components are similarly numbered in FIGS. 6–9 and 13–17.

The clasp 22 (in FIG. 1) is known in the art and is composed of resilient projections 32 and 34, respectively, having detents 33 and 35 for engagement with the respective holes 24 and 26 in the sides of the casing 21. The end wall portion 36 of the clasp 22 serves to close the open end 25 of the casing and hereinafter will be called the clasp wall 36.

Figure 2:
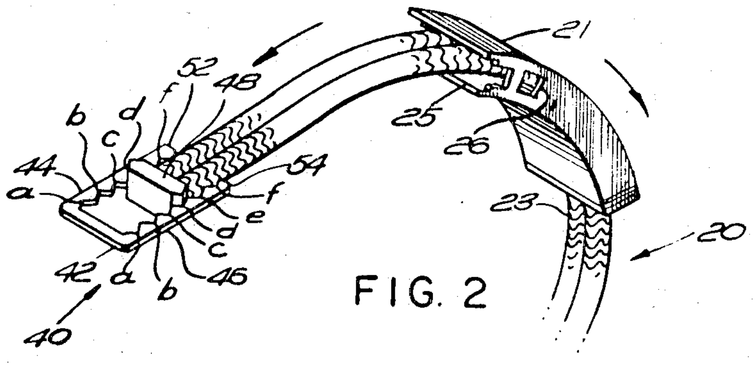
FIG. 2 is a perspective view of the bracelet of FIG. 1 with the casing displaced to reveal the adjustable abutment mechanism.

As seen in the broken away portion of FIGS. 1 and 2 the casing 21 has an end wall 27 containing an opening 28 through which the chain 23 passes in sliding relation. Reference is made to FIGS. 1 thru 5, where a preferred form of the invention is illustrated.

Within the casing 21 is an adjustable abutment plate generally indicated in FIG. 2 by reference numeral 40. The plate 42 is "U" shaped and provided with parallel legs 44 and 46. The legs are notched with matching notches *44a*, *44b*, *44c*, *44d*, *44e*, *44f*, and *46a*, *46b*, *46c*, *46d*, 46*e*, 46*f* to receive a wedge or anchor member 48. This anchor member is fastened to the end of the chain 23 opposite to the clasp end, and has two opposed wedge ends 49 and 50 for respective engagement with the notches in legs 44 and 46. Each of legs 44 and 46 have respective abutment ends 52 and 54.

Figure 3:
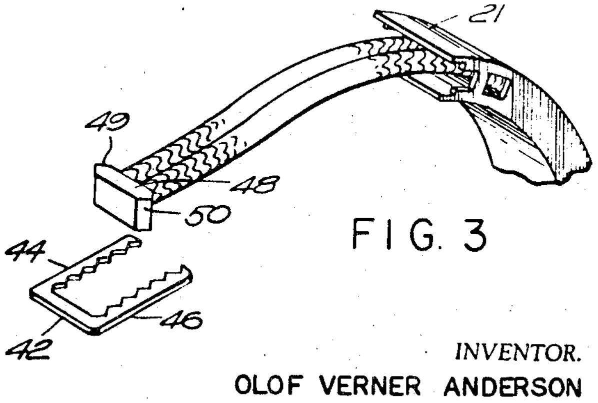
FIG. 3 is a perspective view of the adjustable abutment mechanism of FIG. 2 showing the adjustable abutment mechanism disassembled in preparation for adjustment.
Figure 4:
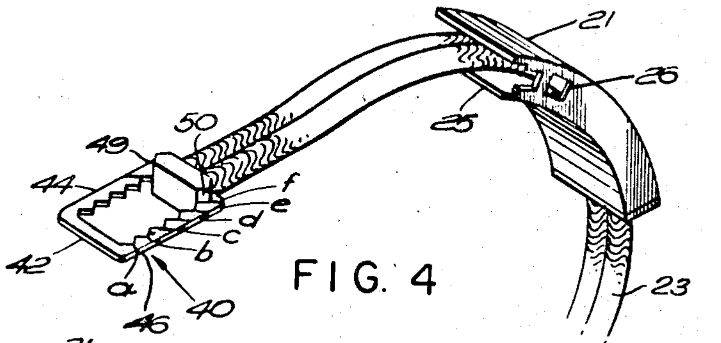
FIG. 4 is a view similar to FIG. 3 showing the mechanism partially assembled after adjustment.
Figure 5:
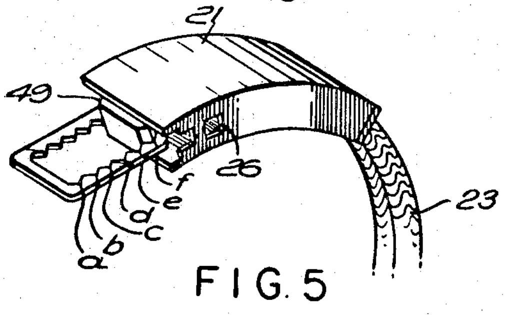
FIG. 5 is a view similar to FIG. 4 showing the mechanism in the process of final assembly.

To adjust the length of the bracelet embodiment shown in FIGS. 1–5 the following procedure is normally followed:

As the initial step, shown in FIG. 2, the chain 23 is pushed into the casing 21 and the casing is simultaneously slid along the chain toward the clasp as shown by the arrows in FIG. 2 to reveal the adjustable abutment plate 40. As shown in FIG. 2, the anchor member 48 is engaged in the notches **44*d* and 46*d* of the U-shaped plate 42. The next step is disengagement of the U-shaped plate. This may be accomplished either by lifting the plate free of the anchor member or pushing it down out of engagement as shown in FIG. 3. To lengthen the bracelet the anchor member 48 is engaged with notches closer to the abutment ends 52 and 54. In FIG. 4 the maximum length tha been established by engagement of the anchor member 48 with the last notches 44*f* and 46*f*. The adjustable abutment plate is then slidably inserted into the casing 21 and the chain 23 pulled tight to bring the abutment ends 52 and 54 into firm engagement with the interior surface of the end wall 27**. At this time the bracelet is ready to be worn.

In the embodiment of FIGS. 6–9 the casing 21 is the same as that of the FIGS. 1–5 embodiment. This similar casing has an end wall 27 with an opening 28 through which the chain 23 passes. The holes 24 and 26 and open end 25 serve the same function as previously described in connection with the embodiments of FIGS. 1–5.

Figure 6:
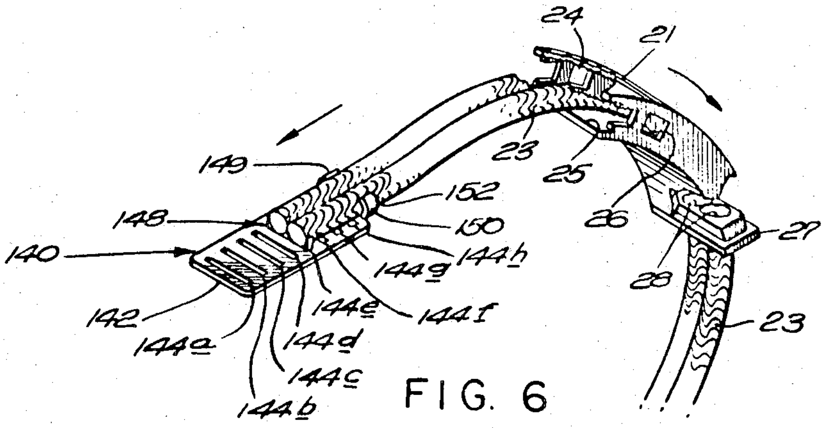
FIG. 6 is a perspective view of another embodiment of an adjustable abutment mechanism, with portion broken away, for reasons of clarity; the mechanism being in preparatory stage for adjustment.

While the adjustable abutment plate 140 is shown displaced in FIG. 6 it is normally within the casing 21 when the bracelet is being worn. This mechanism has a generally rectangular plate 142 fastened by means of bent tabs 149 and 150 to the chain 23. The outer edge 152 is an abutment edge which engages the inner surface of end wall 27 of the casing. The plate is normally oriented with its largest dimension extending longitudinally of the axis of chain.

Transversely oriented of the major division of the rectangular plate and the axis of the chain are a plurality of evenly spaced rectangular openings **144*a* and 144*h* inclusive which are adapted to receive a depending rectangular tongue or anchor member 148 joined to the end of the chain 23**.

To adjust the length of the bracelet shown in FIGS. 6–9 the chain 23 is pushed into the casing and the casing is simultaneously slid along the chain as shown by the arrows in FIG. 6. This brings the adjustable abutment plate 140 into view for adjustment.

Figure 7:
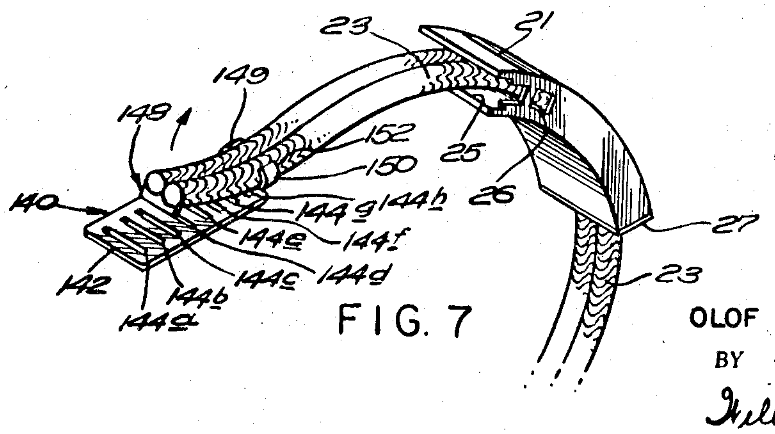
FIG. 7 is a view similar to FIG. 6 showing the mechanism of FIG. 6 in the process of adjustment.
Figures 8, 9, 10, 11:
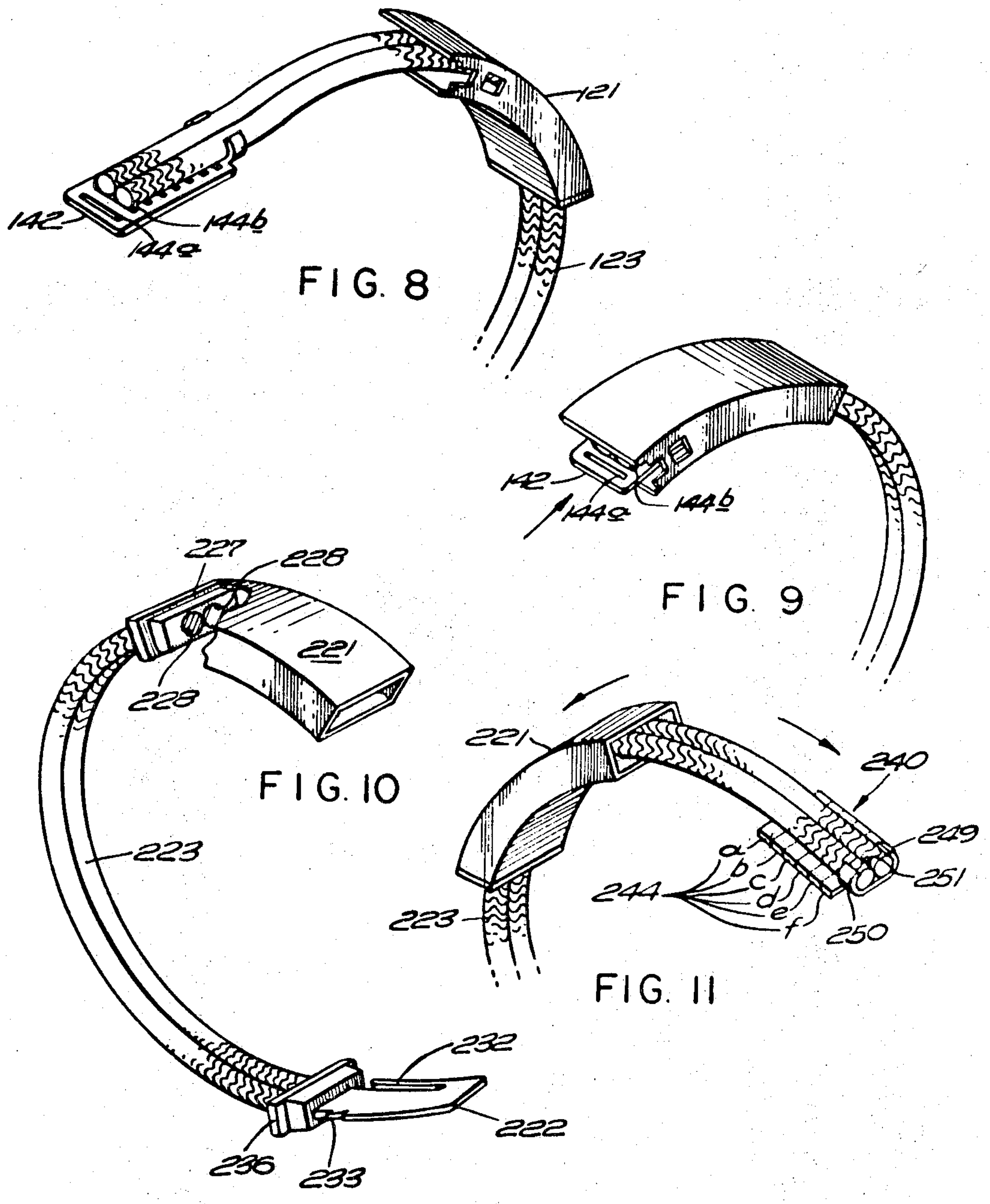
FIG. 8 is a view similar to FIG. 7 showing the mechanism of FIG. 7 partially assembled after adjustment.
FIG. 9 is a view similar to FIG. 8 showing the mechanism of FIG. 8 in the process of final assembly.
FIG. 10 is a perspective view of an identification bracelet having a different form of clasp and casing, with portions broken away, containing another embodiment of adjustable abutment mechanism.
FIG. 11 is a perspective view of the mechanism of FIG. 10 with the casing displaced to reveal the adjustable abutment mechanism.

As shown in FIG. 6 the tongue or anchor member 148 is located within the slot **144*e*. By disengaging the anchor member and lifting it clear of the slot 144*e* as shown in FIG. 7 the plate 142 may be moved either toward or away from the clasp end of the chain. FIG. 8 shows how the bracelet may be shortened. By moving the plate 142 toward the clasp end of the chain the anchor member 148 may be engaged in slot 144*b*. This brings the abutment or outer edge 152 closer to the clasp end so that when the edge 152 is in engagement with the inner surface of wall 27 the total length of the chain is decreased. The last step of restoring the adjustable abutment plate is shown in FIG. 9. The abutment plate 140 is slid into the casing 21**. Once, restored, the bracelet is ready to be worn.

Figures 12, 13, 14, 15:
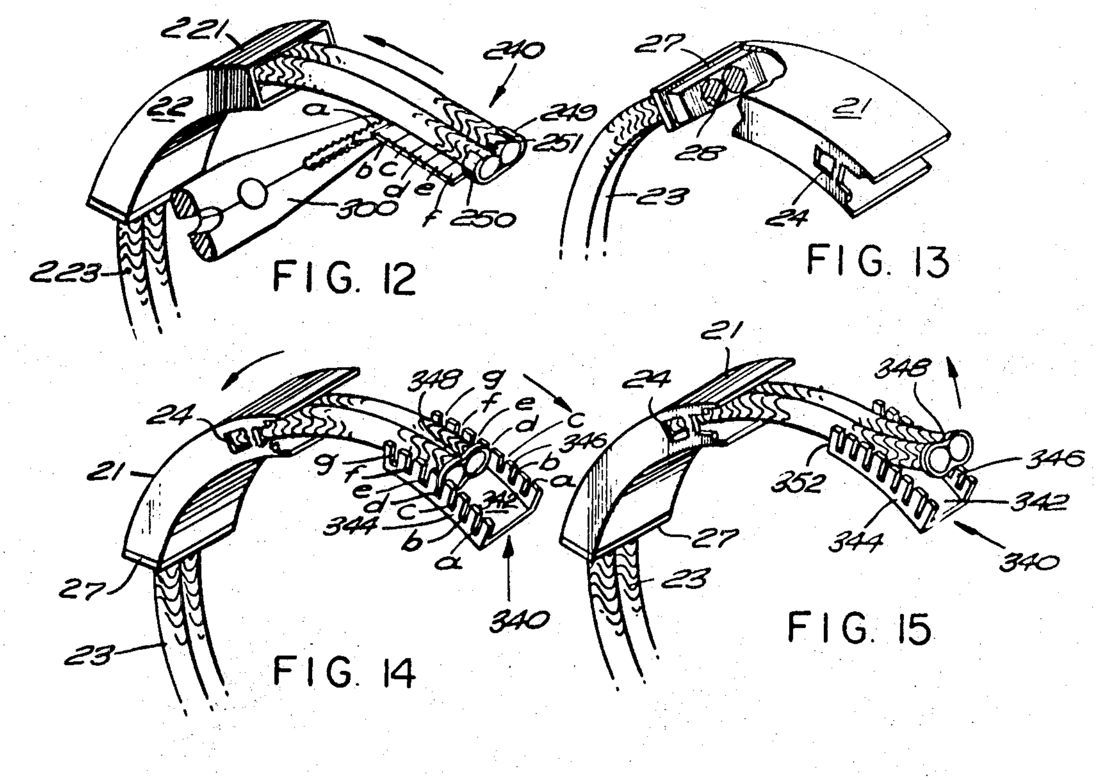
FIG. 12 is a perspective view of the mechanism of FIG. 11 in the process of adjustment.
FIG. 13 is a perspective view of still another embodiment of the present invention with portions of the casing broken away, the bracelet being similar to that of FIGS. 1–9 and having an adjustable abutment mechanism in a preparatory stage for adjustment.
FIG. 14 is a perspective view of the casing of FIG. 13 with an adjustable abutment mechanism extended in preparation for adjustment.
FIG. 15 is a view similar to FIG. 14 showing the mechanism of FIG. 14 in the process of adjustment.

FIGS. 10–12 illustrate a third embodiment. This embodiment, unlike the two previously described, is adjustable only to lengthen the bracelet. However, the same principle of utilizing an abutment member against the interior of an end wall 27 of the bracelet casing 221 prevails in this embodiment.

The casing 221 receives the clasp 222 which snaps into place because the resilient prong 232 and detent 233. The clasp wall 236 closes the end opening 225 of the casing when the clasp is in place.

At the end of the chain 223, opposite that joined to clasp 222, is an adjustable abutment member, generally indicated by numeral 240, joined to the chain by bent tabs 249 and 250 and prong 251. The member 240 is composed of joined removably rectangular tabs **244*a*, 244*b*, 244*c*, 244*d*, 244*e*, and the tab 244*f* which is joined to the tabs 240 and 250 and prong 251**.

To adjust the length of the bracelet of this embodiment the chain 223 is pushed into the casing and the casing 221 is simultaneously slid along the chain as shown by the arrows in FIG. 11. The adjustable abutment mechanism 240 is thus exposed to view for adjustment. Each of the tabs **244*a* through 244*e* is easily removable by a twist of a pair of pliers such as 300 in FIG. 12. Each time a tab is removed the exposed edge of the remaining adjacent tab serves as the abutment edge for the member 240**. Thus the abutment edge is moved toward the end of the chain to which the abutment member is fastened thereby, in effect, lengthening the chain.

The final step in the adjustment of chain 223 is the restoration of casing 221 by sliding it back to its original position as shown by the arrow in FIG. 12.

FIGS. 13–17 illustrate a fourth embodiment which is operable in a manner similar to the embodiments of FIGS. 1–5 and 6–9. The casing of the bracelet also shown here as 21 may be the same as that of FIGS. 1–5 and 6–9. This casing also has an end wall 27 and an opening therethrough. The holes 24 and 26 and open end 25 serve the same function as previously described in connection with the embodiments of 1–9.

Although the adjustable abutment plate 340 is shown extended out of the casing 21 in FIG. 14 it is to be understood that the plate is normally contained within the casing against the wall 27, when the bracelet 20 is worn. However, for all functional purposes abutment plate 340 is a separate element and free of the casing. This plate is channel shaped and comprises a web 342 and two flanges 344 and 346. These flanges are each slotted with evenly spaced slots designated *a* through *g*.

Fastened to the end of band or chain 23 is collar or anchor member 348 which is dimensioned to extend between and engage the slots of the two flanges 344 and 346. As shown in FIG. 14 the anchor member is in engagement with slots **344*d* and 346*d***.

Figures 16, 17:
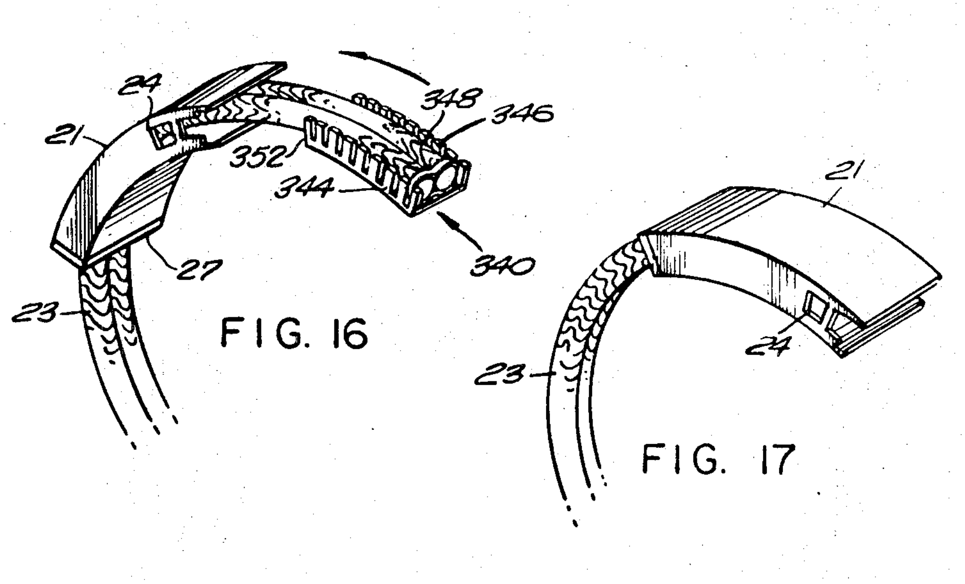
FIG. 16 is a view similar to FIG. 15 showing the mechanism of FIG. 15 partially assembled after adjustment.
FIG. 17 is a view similar to FIG. 16 showing the mechanism of FIG. 16 in its final assembled stage.

To adjust the length of the band the anchor member 348 is lifted free of the slots, see FIG. 15, and then moved to different desired slots. In FIG. 16 the adjustment of the bracelet to the shortest length is accomplished by engaging anchor member 348 in slots **344*a* and 346*a*. This places the anchor member 348 farthest from the abutment end 352 of the abutment plate 340. To increase the length of band 23, the anchor member 348 is placed in slots 344*g* and 346*g* nearest to abutment end 352. Thus when the adjustable abutment plate 340 is slidably restored within the casing 21 the abutment face 352 will bear on the interior surface of the wall 27**.

It will be understood that although the embodiments of the adjustable abutment plates described and illustrated here are straight sided and basically flat, they may be curved or rounded and still utilize the basic principle of the invention. The embodiments of FIGS. 1–5, 6–9 and 13–17 are adjustable to either lengthen or shorten a bracelet band. The principle of utilizing an adjustable abutment plate against an end wall of the casing is applicable to lengthen the band in the embodiment of FIGS. 11–12.

Having shown and described preferred embodiments of the present invention by way of example, it should be realized that structural changes could be made and other examples given without departing from either the spirit or scope of this invention.

What I claim is:

1. An adjustable bracelet comprising a hollow elongated casing with an end wall closing one end of said casing, a clasp adapted to be rearwardly engaged with the casing, and a band having two ends, an opening in said end wall for said band to slidably pass through said end wall, means fastening one end of said band to said clasp, and anchor means, means fastening the other end of said band to said anchor means, a separate U-shaped abutment plate within and free from said casing, said plate having side flanges and having abutment means including an end for engagement with the interior surface of said end wall to prevent withdrawal of said abutment plate through said opening, means on said abutment plate to receive and secure said anchor means, said means on the abutment plate comprising slots in said flanges at varying distances from said abutment end and any confronting pair of which is adapted to receive said anchor means.

2. The adjustable bracelet of claim 1 in which the U-shaped abutment plate defines a channel formed by said side flanges which are in parallel relation, and in which the anchor means comprises a collar adapted to abut the walls of a pair of said slots.

References Cited

UNITED STATES PATENTS

| | | | |
|---|---|---|---|
| 302,437 | 7/1884 | Simmons. | |
| 1,700,489 | 1/1929 | Dalo. | |
| 2,143,702 | 1/1939 | Kestenman. | |
| 2,412,812 | 12/1946 | Karasik. | |
| 2,615,227 | 10/1952 | Hornik | 24—230 |
| 2,635,315 | 4/1953 | Kaufman | 63—4 X |
| 2,648,886 | 8/1953 | Prestinari et al. | |
| 3,042,277 | 7/1962 | Stradella. | |

F. BARRY SHAY, Primary Examiner